Figure 1:
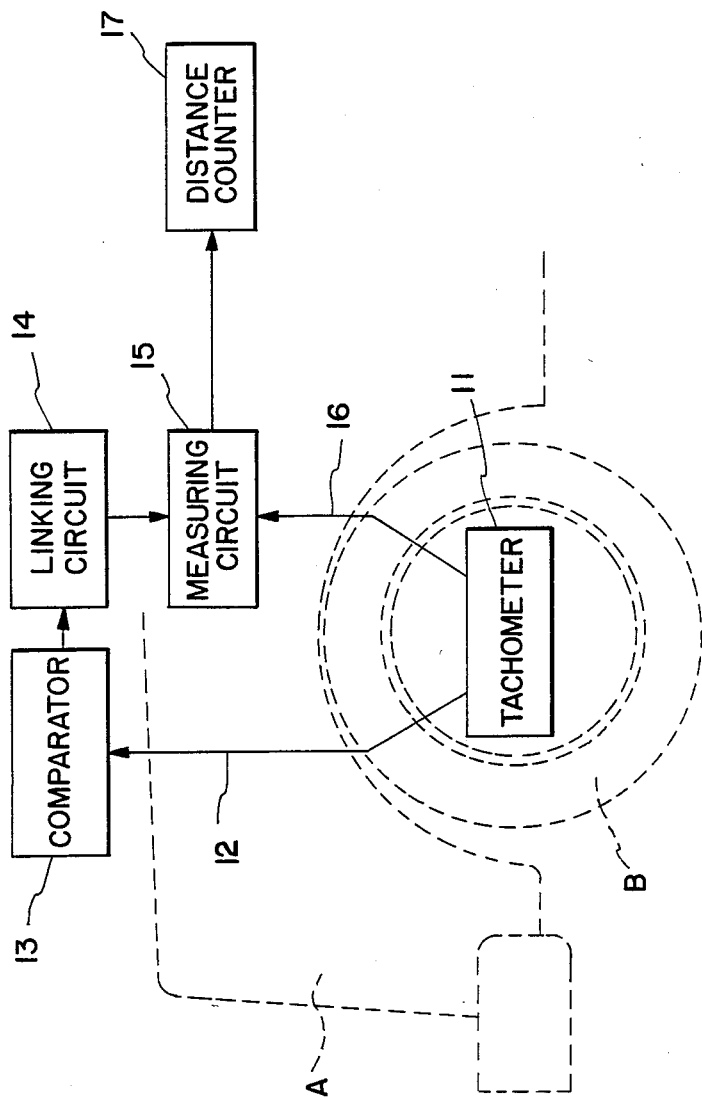

United States Patent [19]

Lie

[11] Patent Number: 4,916,953

[45] Date of Patent: Apr. 17, 1990

[54] DEVICE FOR MEASURING THE MOVEMENT OF A MOTOR VEHICLE

[76] Inventor: Jon Lie, Postboks 54, 2391 Moelv, Norway

[21] Appl. No.: 180,988

[22] PCT Filed: Aug. 11, 1987

[86] PCT No.: PCT/NO87/00059
§ 371 Date: Mar. 31, 1988
§ 102(e) Date: Mar. 31, 1988

[87] PCT Pub. No.: WO88/01415
PCT Pub. Date: Feb. 25, 1988

[30] Foreign Application Priority Data

Aug. 12, 1986 [NO] Norway .............................. 863235

[51] Int. Cl.⁴ .......................... G01P 3/16; G01P 3/42
[52] U.S. Cl. ....................................... 73/535; 73/537; 73/490; 340/441
[58] Field of Search ............... 73/535, 536, 537, 490, 73/491; 340/53, 62

[56] References Cited

U.S. PATENT DOCUMENTS

| 3,860,905 | 1/1975 | Guerini | 340/62 |
| 4,007,438 | 2/1977 | Protonantis | 340/62 |
| 4,236,142 | 11/1980 | Lindsey | 340/62 |
| 4,250,487 | 2/1981 | Arnold | 340/62 |
| 4,608,551 | 8/1986 | Takeo et al. | 340/62 |

Primary Examiner—Hezron E. Williams
Assistant Examiner—Robert P. Bell
Attorney, Agent, or Firm—James E. Pittenger

[57] ABSTRACT

A device for measuring the movement of a motor vehicle with a speedometer (11, 13) which produces a control signal when it is determined that the speed has exceeded a predetermined limit. A distance gauge (11, 15) is equipped with a release mechanism (14) which is activated by the control signal so that a record can be made of the distance driven only when such a control signal is received from the speedometer. The distance gauge (11, 15) is preferably equipped with a connecting device (14) which permits a stepwise or continuous increase in the weighting of distance registration following increased speed above the first, predetermined limit.

7 Claims, 2 Drawing Sheets

DEVICE FOR MEASURING THE MOVEMENT OF A MOTOR VEHICLE

The invention relates to a device for measuring a vehicle's movement.

Different devices exist for measurement of vehicle movements which can record the speed for a certain period of time and distance. Such devices have primarily aimed at informing the driver of a vehicle about this speed whilst in motion and registering the distance travelled. The latter is partly achieved by continuous measurement and partly by measuring from a starting point. This is known as a trip meter.

Speedometers are also found which record the speed of a vehicle and keep a record on a supporting medium. This enables the use of a vehicle to be checked retrospectively to determine whether the speed has exceeded specified limits. This method does not however provide an easy, accurate and secure way of knowing the speed in k.p.h. or how long the vehicle has exceeded a certain speed limit.

The development of faster vehicles, the increase in the traffic density and to some extent the change in driving attitudes regarding speed violations, have made it necessary to supervise speeding violations systematically and accurately in a way that can create a means of raising revenue from fines for the violations.

The main object of the invention is to create a device to measure the distance a vehicle has travelled at a certain, predetermined range of speed, particularly in excess of specified legal limits. The device should be able to register the total distance driven at different speed intervals, with the possibility of weighting the results according to a prespecified range of values. The device should be simple and robust so that the compulsory purchase price can be kept low.

Furthermore, it should be simple to install, reliable and maintenance free. It should be reliable in the sense that it is not possible to disconnect the registration function without leaving marks, such as breaking a seal for instance. The device should preferably be able to be used independently of external power supplies.

According to the invention this can be achieved by designing the device in accordance with the characterizing part of claim 1. The control signal can be an electronic signal or mechanical transmission of motion. Additional advantages of the invention are stated in the subsidiary claims.

Such a measuring device will make it possible to measure speeding violations so that they can create a means of raising revenue from fines. This assumes that such a measuring device is compulsory and is fitted in all the vehicles within specific categories, for example, passenger cars, delivery trucks, and motorcycles.

The invention can be constructed in different ways. In its simplest form, it can consist of a centrifugal gauge connected to a distance meter as described in the example below. It can also be supplied with its own power supply so that it can have an electronic measuring circuit. Furthermore, it is possible to combine mechanical and electronical-based methods of measurement. It is envisaged that a magnetic element could be employed to develop a satisfactory electromechanical gauge.

Figure 2:
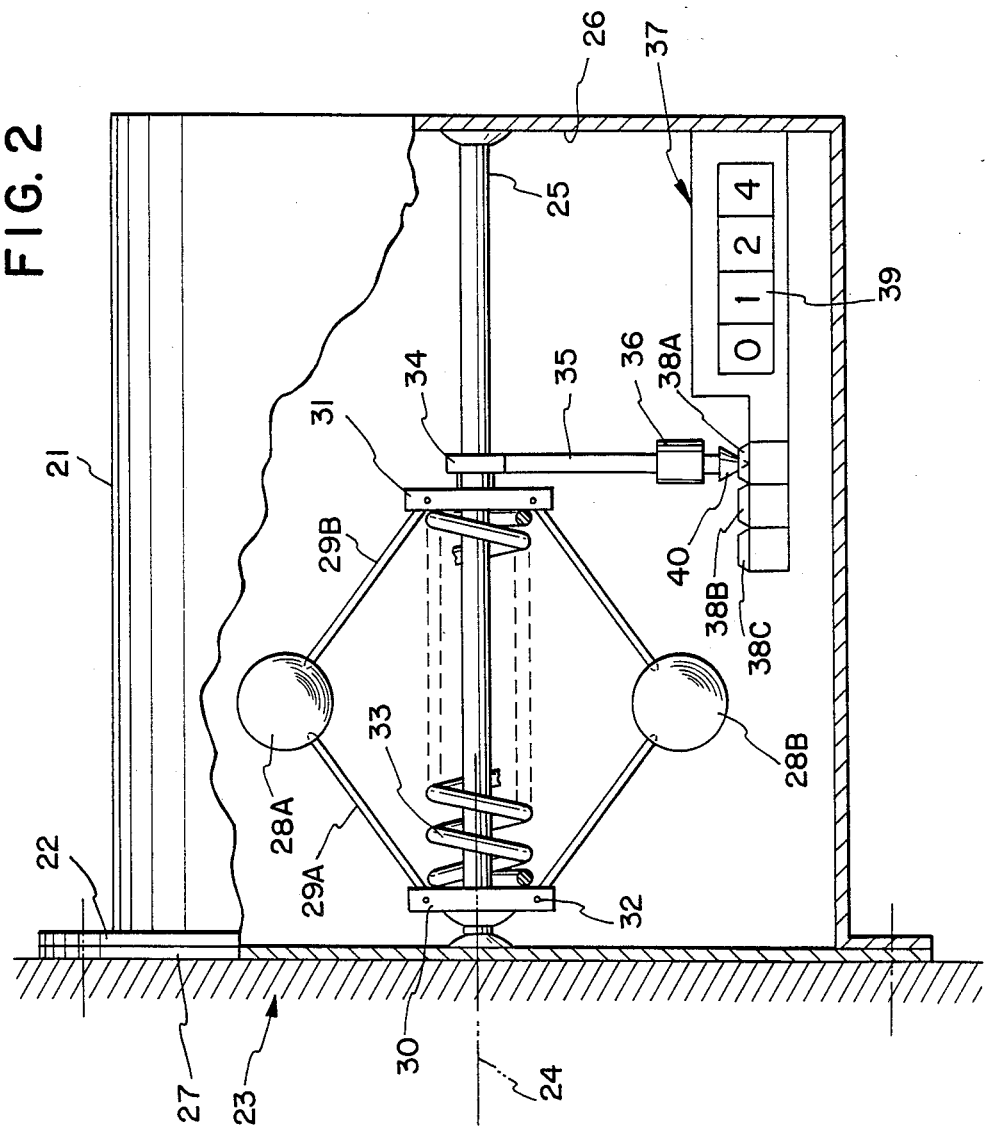

Example:

The invention will be described in more detail below with reference to the drawings where:

FIG. 1 is a block diagram illustrating the main elements in a design based on electronic elements, while FIG. 2 is a schematic axial cross-section through a mechanical design based on a centrifugal measurement of the speed.

In FIG. 1, part of a motor vehicle A and a wheel B are indicated by broken lines. From the hub of wheel B, cables lead from a built-in tachometer 11 which emits a voltage which is proportional to the vehicle speed. The tachometer can also be connected to a drive head which rotates with a speed which is in a constant relation to the speed of the drive wheel, the transmission output axle for instance. An electrical cable 12 leads to a comparator 13 which compares the tachometer voltage with a reference voltage which equates to a certain speed, e.g. 90 k.p.h. The comparator 13, which can be built using existing design, will emit an output signal only when the tachometer exceeds the specified reference voltage.

The reference voltage supply is not shown in the drawing. It can either come from a battery or an internal power supply designed as a constituent part of the tachometer.

The output voltage from the comparator 13 is then fed to a linking circuit 14 which is attached to a measuring circuit 15 for distance determination. The measuring circuit 15, hereafter called the the distance gauge, receives a main-input signal through cable 16 from the tachometer 11. The distance gauge 15 includes an integrated circuit attached to a timer. By combining the speed-proportional voltage with the time signal an output signal is created which is proportional to the distance covered.

The connection between the linking circuit 14 and the distance gauge 15 is designed so that the distance gauge will only be activated when a signal is received from the comparator 13. This means that distance is only registered when the speed exceeds the limit specified in the comparator.

The distance gauge 15 is connected to a counter 17 which successively registers the continuous distance travelled at speeds above the limit. By adjusting the boundary value one is provided with a simple measure for a speed violation over a certain limit, e.g. 90 k.p.h. The counter 17 can be designed to register the total distance without any possibility of external influence.

This design can be modified in different ways. The most appropriate consists of an expansion of the comparator 13 and the linking circuit 14 to react differently to various speeds. The comparator 13 can be designed so that it gives different output signals for specified speeds. In its simplest form this could be stepwise, e.g. with an interval range of 10 k.p.h. Using another design, the comparator would emit a signal with a component that increases evenly with the speed, e.g. proportionally or with a certain degree of increase (progression), and in addition a stepwise signal that produces a jump at certain speeds, e.g. at 90 k.p.h. A signal like this can be created using known circuit technology and will not be further described.

With the modifications of the comparator 13 which are described above it is necessary to adapt the linking circuit 14 so that it varies the distance gauge output signal. When the comparator 13 is designed to emit several different output signals for violations of different speed limits, the linking circuit 14 is switched into a multiplier circuit that enhances the signal from the distance meter by a signal received from the comparator 13. The signal for lowest speed violation could for instance have a factor of 1, at 10 k.p.h higher, this could have a factor in the area 1.5 to 2, while a speeding violation at a still higher level, of say 20 k.p.h over the first, could have a factor in the area of 2 to 5.

This multiplication effect which has an influence on the signal from the distance gauge 15 means that the distance measurement is weighted so that it no longer measures the actual distance driven at a speed above the limit, but instead records a "high speed value" with greater weighting when the speed increases.

If the comparator is designed so as to emit a continuously increasing output signal to the linking circuit 14, a multiplier circuit must be used which has a stepless variable multiplier effect. Multiplier circuits like these are known technology.

Such weighted measurement of motion can be designed with boundary values and weighting criteria which make it possible to use the registered value for the calculation of fines where those who violate the speed limit which is programmed into the device by a sizeable margin and too frequently are liable to progressive fines. The device can be designed with a progression so that paying such fines regularly will hinder car drivers who are tempted to drive a high speeds.

FIG. 2 schematically shows an example of a mechanical version of the invention. A house 21 shaped like a cylindrical box is attached by its flange 22 to a wheelhub 23 on a motor vehicle, so that the axis of the housing 24 is concentric to the hub axis. This housing can have an alternative location which is equivalent to that described for the tachometer generator in the above example. In this case a suitable oakum linking must be provided. In the center of the house 21 a mandrel 25 is attached. The mandrel 25 is permanently located between the bottom 26 and the top 27 of the house by slotting into central countersinks in these two parts.

At the end which is against the top 27 the mandrel 25 carries two weights 28A and 28B which are linked by joints to their respective brackets 29A and 29B. The brackets 29A and 29B are positioned between two discs 30 and 31 which are mounted and evenly spaced on the mandrel 25. The discs 30 and 31 can be circular metal discs with cut-outs for the end of the brackets 29A and 29B and holes for attachement rivets 32. The disc 30 which is outermost on the mandrel 25 close to the top 27, is permentely attached to the mandrel by force fitting for example. The other, inner disc 31 could be allowed to slide freely on the mandrel, since the mandrel and the opening in the disc 31 are adjusted to each other so that there is a firm, easy slide fit.

Between the discs 30 and 31, a helical spring 33 is attached to the mandrel 25 this spring driving presses the moveable disc 31 towards an end position. The housing 21 and the mandrel 25 will rotate with the hub 23, while the disc 30 which is fixed on the mandrel 25 will force the weights 28A and 28B to rotate together with it so that they will be moved radially by the centrifugal force and thereby force the disc 31 against the helical spring 33.

Next to the inner disc 31 is a bearing 34 fixedly attached on the mandrel 25. The bearing 34 carries an arm 35, which on account of its weight and the lack of friction in the bearing 34 will hang vertically downward. In this example the arm 35 has a plumb bob 36 on its free end, which prevents the arm from oscillating.

A mechanical counter 37 is attached to the bottom 26 of the house 21 with three activating keys 38A-C and a display 39. The counter 37 is placed so that the activating keys 38 A-C lie on a row angled towards the end of the arm 35, which is supplied with an activating lug 40. With a speed of rotation below a certain driving speed e.g. 90 k.p.h, the activating lug 40 is in a dead position in a blind zone to the right of the activating key 38A in FIG. 2. The activating keys 38A-C will then freely rotate past the activating lug. When the speed increases the activating lug 40 will be pulled towards the left in the figure. The activating lug 40 will consequently hit one of the activating keys 38A-C each time the counter 37 rotates past the arm 35 which is hanging down or suspended. Such contact will release the forward movement of the counting mechanism of the counter 37 according to a specific pattern.

The three activatings keys 38A-C are connected to the counter mechanism so that the first, 38A, which is closest to the bottom 26 of the house 21 releases one count, the second, 38B releases two counts and the third, 38C releases three or four counts. When the arm 35 is pulled towards the top 27 by increased speed: all counts from activating key 38A will be released at an initial predetermined speed; counts from activating key 38B at a second, higher speed and; counts from activating key 38C at a third, even higher speed. By finding a suitable relationship between the heaviness of weights 28A and 28B and the strength and characteristics of the spring 33, the transition from single counting to double counting and then to tripple or quadruple counting will occur upon infringements of predetermined speed limits.

The display 39 is located so that it can be read through a transparent part of the sidewall of the house 21. The house 21 is preferably made out of metal with enough mechanical strength to be able to resist the strains where it is mounted and the usage to which it will be subjected. It should be suitably mounted with screws or the like, which could be sealed officially to ensure that any manipulation with the counter mechanism will be discovered.

The designs which are illustrated and described and are within the scope of the claims of Patent can be modified in different ways. In addition to the alternatives already mentioned it should also be noted that a combination of a mechanical and an electronic system can be used, e.g. using electronic means of reading a centrifugal mechanism as shown in FIG. 2. To avoid dependency upon other power supplies, which could introduce the possibility of manipulation with the connection, the electronic elements used should generate sufficient output for the operation of the circuitry.

I claim:

1. A device for measuring the movements of a motor vehicle, which includes a distance gauge, a meter with a counter mechanism that records the distance travelled by the vehicle and a speedometer which registers the vehicle's speed, is characterized by the speedometer being provided with the means for producing a control signal when the speed of the vehicle is determined to be over a predetermined limit and the distance gauge is equipped with a release mechanism which is activated by the control signal so that a record of the distance driven is only made when a such a control signal is received from the speedometer; and the distance gauge is equipped with a connecting device which produces an increase in the weighting of the distance registration following increased speed above the first, predetermined limit.

2. A device in accordance with claim 1, is characterized by the speedometer being equipped to emit additional control signals at speeds which exceed equivalent speed levels above the first limit, said distance gauge being equipped to receive said higher control signals to give an increased weighting of the distance registration at speeds above the first limit and the respective higher levels.

3. A device in accordance with claim 2, is characterized by the speedometer emitting both a second and a third control signal at a speed which exceeds the first speed limit by 10 k.p.h. and 20 k.p.h. respectively.

4. A device in accordance with claim 1 is characterized by the speedometer being a centrifugal mechanism connected to the vehicle's wheel, the centrifugal mechanism is equipped to move an arm which is engaged to a key for the activation of a distance gauge when a certain, predetermined speed is exceeded so that the counter mechanism registers the distance driven at the speed above the predetermined limit.

5. A device in accordance with claim 4, is characterized by the counter mechanism being equipped with a switching device which registers the distance with a weighting factor when the device is activated, said switching device being linked to the arm from said centrifugal mechanism in a way that it is activated when the centrifugal mechanism registers an increase in speed at a specific level above the first speed limit.

6. A device in accordance with claim 4, is characterized by the distance gauge being equipped with a counter mechanism which can register the distance with three different conversion factors.

7. A device in a accordance with claim 6, is characterized by the conversion factors being in a scale ranging from approximately 1:2:5, with higher conversion factors for increasing speed.

* * * * *